US011312389B2

(12) United States Patent
Imaizumi et al.

(10) Patent No.: US 11,312,389 B2
(45) Date of Patent: Apr. 26, 2022

(54) PROVIDING INFORMATION TO VEHICLE OCCUPANTS BASED ON EMOTIONS

(71) Applicant: HONDA MOTOR CO., LTD., Tokyo (JP)

(72) Inventors: Satoshi Imaizumi, Wako (JP); Shinichiro Goto, Wako (JP); Eisuke Soma, Wako (JP); Hiromitsu Yuhara, Wako (JP); Keiichi Takikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/267,641

(22) Filed: Feb. 5, 2019

(65) Prior Publication Data
US 2019/0243459 A1 Aug. 8, 2019

(30) Foreign Application Priority Data

Feb. 7, 2018 (JP) .............................. JP2018-020056

(51) Int. Cl.
*B60W 50/14* (2020.01)
*G06F 3/01* (2006.01)
(Continued)

(52) U.S. Cl.
CPC ............ *B60W 50/14* (2013.01); *B60K 35/00* (2013.01); *B60W 40/08* (2013.01); *B60W 50/08* (2013.01);
(Continued)

(58) Field of Classification Search
CPC .......... G06F 3/017; G06F 3/167; G06F 3/015; G06F 2203/011; B60K 35/00;
(Continued)

(56) References Cited

U.S. PATENT DOCUMENTS

| 6,190,314 B1 * | 2/2001 | Ark ........................... A61B 5/16 600/300 |
| 10,151,594 B1 * | 12/2018 | Chan ..................... B60W 40/09 |

(Continued)

FOREIGN PATENT DOCUMENTS

| CN | 101428164 A | 5/2009 |
| CN | 106562792 A | 4/2017 |

(Continued)

OTHER PUBLICATIONS

Abtahi, S., B. Hariri, and S. Shirmohammadi. 2011. Driver Drowsiness Monitoring Based on Yawning Detection. doi:http://dx.doi.org/10.1109/IMTC.2011.5944101. (Year: 2011).*

(Continued)

*Primary Examiner* — Justin R. Blaufeld
(74) *Attorney, Agent, or Firm* — Westerman, Hattori, Daniels & Adrian, LLP

(57) ABSTRACT

An information providing device includes an emotion estimation unit that estimates the emotion of an occupant within a predetermined period of time from the time when the occupant gets in a vehicle (STEP 114), a base-emotion setting unit that sets a base emotion of the vehicle on the basis of the emotion of the occupant (STEP 120), a vehicle-state detection unit that detects the state of the vehicle (STEP 122), an emotion generation unit that generates the emotion of the vehicle in accordance with the base emotion and the state of the vehicle (STEP 126), an information determination unit that determines, on the basis of the emotion of the vehicle, information to be provided to the occupant (STEP 128), and an information output unit that outputs information to the occupant (STEP 130).

11 Claims, 8 Drawing Sheets

(51) Int. Cl.
    *G06F 3/16* (2006.01)
    *B60K 35/00* (2006.01)
    *G06K 9/00* (2006.01)
    *B60W 40/08* (2012.01)
    *B60W 50/08* (2020.01)
(52) U.S. Cl.
    CPC .............. *G06F 3/015* (2013.01); *G06F 3/017* (2013.01); *G06F 3/167* (2013.01); *G06K 9/00845* (2013.01); *B60K 2370/186* (2019.05); *B60K 2370/1876* (2019.05); *B60W 2040/0872* (2013.01); *B60W 2050/146* (2013.01); *B60W 2540/22* (2013.01); *B60W 2540/221* (2020.02); *G06F 2203/011* (2013.01)
(58) Field of Classification Search
    CPC ..... B60K 2370/1876; B60K 2370/186; B60W 40/08; B60W 50/14; B60W 50/08; B60W 2050/146; B60W 2540/22; B60W 2540/221; B60W 2040/0872; G06K 9/00845
    See application file for complete search history.

(56) References Cited

U.S. PATENT DOCUMENTS

| | | | |
|---|---|---|---|
| 2003/0060937 A1* | 3/2003 | Shinada | G01C 21/3641 701/1 |
| 2005/0114142 A1* | 5/2005 | Asukai | H04M 1/72436 704/270 |
| 2008/0269958 A1* | 10/2008 | Filev | A61B 5/18 701/1 |
| 2014/0323013 A1* | 10/2014 | Gonzalez-Heydrich | A61B 5/165 446/484 |
| 2015/0078632 A1* | 3/2015 | Hachisuka | G06K 9/00832 382/118 |
| 2017/0030726 A1 | 2/2017 | French et al. | |
| 2017/0102765 A1* | 4/2017 | Yoneda | G06F 3/0304 |
| 2017/0115124 A1* | 4/2017 | Mullen | G01C 21/3667 |
| 2017/0161016 A1* | 6/2017 | McDunn | G06F 3/167 |
| 2017/0370736 A1 | 12/2017 | Singh | |
| 2018/0061415 A1* | 3/2018 | Penilla | G01C 21/3641 |
| 2018/0118218 A1* | 5/2018 | Miloser | B60W 10/30 |
| 2018/0184959 A1* | 7/2018 | Takahashi | A61B 5/1118 |
| 2018/0204570 A1* | 7/2018 | Puranik | B60K 37/06 |
| 2018/0225551 A1* | 8/2018 | Lin | B60H 3/0035 |
| 2019/0161088 A1* | 5/2019 | Goto | G06K 9/00315 |
| 2019/0232974 A1* | 8/2019 | Reiley | B60W 60/0013 |
| 2019/0276037 A1* | 9/2019 | Ito | G06K 9/00335 |
| 2020/0272225 A1* | 8/2020 | Yoneda | G06F 3/0304 |

FOREIGN PATENT DOCUMENTS

| | | | | |
|---|---|---|---|---|
| CN | 206287926 U | 6/2017 | | |
| CN | 107405120 A | 11/2017 | | |
| JP | 2003-072488 A | 3/2003 | | |
| JP | 2008-070965 A | 3/2008 | | |
| JP | 2008-241309 A | 10/2008 | | |
| JP | 2013216241 A | * | 10/2013 | ......... G06K 9/00308 |
| JP | 2015-110417 A | 6/2015 | | |
| JP | 2017-181449 A | 10/2017 | | |
| JP | 2017-201499 A | 11/2017 | | |
| JP | 2019098779 A | * | 6/2019 | ........... B60W 40/09 |
| WO | 2017/104793 A1 | 6/2017 | | |

OTHER PUBLICATIONS

Miyaji, Masahiro. 2017. "Driver's State Alert Function by using Facial Expression Classification in Cooperation with Artificial Intelligence." International Journal of Advanced Studies in Computer Science and Engineering 6 (5): 13-17. (Year: 2017).*

Office Action dated Aug. 27, 2019, issued in counterpart JP Application No. 2018-020056, with English translation. (8 pages).

Office Action dated Dec. 17, 2021, issued in counterpart to CN Application No. 201811534268.8, with English Translation. (12 pages).

* cited by examiner

FIG. 4

| BASIC EXPRESSION | LIKING | | CALMNESS | | DISLIKING | | WITHSTANDING | |
|---|---|---|---|---|---|---|---|---|
| BASIC FACIAL EXPRESSION | | | | | | | | |
| APPLIED EXPRESSION | LOVELY | FUN | HAPPY | RELIEVED | SAD | ANGRY | SUFFERING | PAINFUL |
| OPTIONAL PARTS | | | | | | | | |
| APPLIED FACIAL EXPRESSION | | | | | | | | |

FIG. 5A

| DATE AND TIME | EMOTION OF USER |
|---|---|
| 2018/2/1 7:00 | (-3, -3) |
| 2018/2/2 7:00 | (-1, -2) |

FIG. 5B

| DATE AND TIME | EVENT |
|---|---|
| 2018/2/2 10:00 TO 19:00 | XX MEETING |
| 2018/2/8 10:00 TO 19:00 | YY MEETING |

FIG. 5C

| ITEM | AUXILIARY OFFSET |
|---|---|
| FRIDAY | (1, 2) |
| XX MEETING | (2, 2) |
| YY MEETING | (2, 1) |

FIG. 5D

| STATE OF VEHICLE | AUXILIARY OFFSET |
|---|---|
| REMAINING AMOUNT OF FUEL IS EQUAL TO OR LOWER THAN PREDETERMINED AMOUNT | (-5, -5) |
| STATE IN WHICH TRAVELLING SPEED IS EQUAL TO OR HIGHER THAN PREDETERMINED SPEED CONTINUES FOR A CERTAIN PERIOD OF TIME OR LONGER | (3, 3) |

FIG. 5E

| EMOTION | CONTENT |
|---|---|
| STEADY STATE IS 3 OR GREATER AND CALMNESS IS 3 OR GREATER | MUSIC A |
| STEADY STATE IS -1 OR LESS AND CALMNESS IS -1 OR GREATER | MESSAGE B PROMPTING MAINTENANCE |

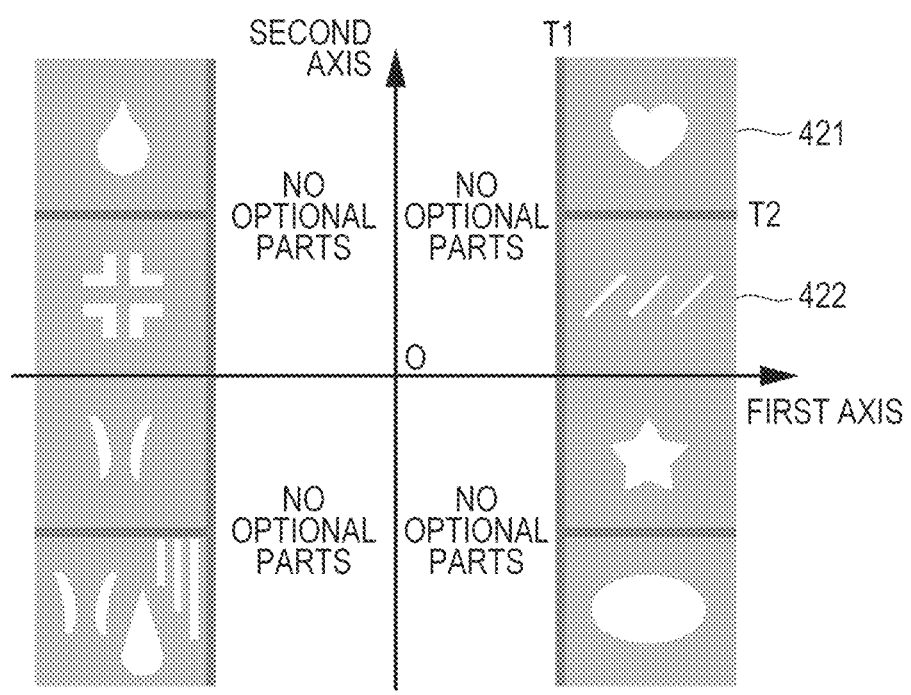

PROVIDING INFORMATION TO VEHICLE OCCUPANTS BASED ON EMOTIONS

CROSS REFERENCES TO RELATED APPLICATIONS

The present application claims priority under 35 U.S.C. § 119 to Japanese Patent Application No. 2018-020056, filed Feb. 7, 2018, entitled "Information Providing Device and Information Providing Method." The contents of this application are incorporated herein by reference in their entirety.

TECHNICAL FIELD

The present disclosure relates to an information providing device and an information providing method.

BACKGROUND

In the related art, there is known a device that provides information to an occupant of a vehicle.

When information is provided to an occupant who is driving a vehicle, there are cases where the occupant feels that the information is annoying when the occupant is concentrating on driving and where the occupant cannot notice or understand the information because the occupant is paying attention to driving. To solve such a problem, for example, Japanese Unexamined Patent Application Publication No. 2008-241309 discloses a device that holds information instead of providing the information to a driver when a large driving load is applied to the driver and that provides the information to the driver when a small driving load is applied to the driver so that the information can be provided in accordance with the level of the driving load applied to the driver without distracting the driver's attention.

However, the inventors found that, in the technology described in Japanese Unexamined Patent Application Publication No. 2008-241309 for determining whether to provide information on the basis of the level of a driving load, there is a possibility that an occupant who receives information may feel that the provided information is annoying depending on the emotion of the occupant such as, for example, being in a bad mood. In addition, there may be an occupant who feels that provided information that is unilateral and monotonous is uninteresting. If annoying information or uninteresting information is kept provided to an occupant by an information providing device, there is a possibility that the occupant will avoid the use of the information providing device.

SUMMARY

The present application describes an information providing device and an information providing method capable of providing information in which an occupant of a vehicle may be interested while reducing or eliminating annoyance that is experienced by the occupant as information is provided to the occupant.

In one embodiment, an information providing device according to the present disclosure includes an emotion estimation unit that estimates an emotion of an occupant within a predetermined period of time from a time when the occupant gets in a vehicle, a base-emotion setting unit that sets a base emotion, which is a base of an emotion of the vehicle, based on the emotion of the occupant estimated by the emotion estimation unit, a vehicle-state detection unit that detects a state of the vehicle, an emotion generation unit that generates the emotion of the vehicle in accordance with the base emotion and the state of the vehicle detected by the vehicle-state detection unit, an information determination unit that determines, based on the emotion of the vehicle, information to be provided to the occupant, and an information output unit that outputs the information to the occupant.

According to the information providing device having the above-described configuration, for example, the emotion of the occupant within a predetermined period of time from the time when the occupant gets in the vehicle is estimated by the emotion estimation unit.

Then, a base emotion, which is the base of the emotion of the vehicle, is set by the base-emotion setting unit on the basis of the emotion of the occupant estimated by the emotion estimation unit.

Subsequently, the emotion of the vehicle is generated by the emotion generation unit in accordance with the base emotion and the state of the vehicle detected by the vehicle-state detection unit.

After that, information to be provided to the occupant is determined by the information determination unit on the basis of the emotion of the vehicle.

Since the base emotion is an emotion that is set on the basis of the emotion of the occupant estimated within the predetermined period of time from the time when the occupant gets in the vehicle, the emotion of the vehicle that is generated in accordance with the base emotion is an emotion according to the emotion of the occupant within the predetermined period of time from the time when the occupant gets in the vehicle.

The emotion of the occupant within the predetermined period of time from the time when the occupant gets in the vehicle often indicates the status of the occupant, which is, for example, the occupant being excited before a holiday. The emotion of the vehicle is generated by taking into consideration the emotion of the occupant within the predetermined period of time from the time when the occupant gets in the vehicle that may indicate such a status of the occupant, and information to be provided to the occupant is determined in accordance with the emotion of the vehicle. As a result, the occupant can feel that the vehicle sympathizes with the situation of the occupant, and this may cause the occupant to be interested in the provided information.

In addition, the emotion of the vehicle is generated by the emotion generation unit by taking an emotion into consideration in accordance not with the emotion of the occupant that is estimated during the period when the vehicle is travelling but with the state of the vehicle.

The emotion of the occupant that is estimated during the period when the vehicle is travelling is influenced by many factors such as relationships with other vehicles, changes of traffic lights, and road conditions, and thus, there is a possibility that the emotion of the occupant will wildly change depending on the personality of the occupant. In contrast, changes in the state of the vehicle are small, and thus, as a result of the emotion of the vehicle being generated by taking the emotion into consideration in accordance with the state of the vehicle, frequent changes in the emotion of the vehicle can be suppressed while the state of the vehicle is reflected in the emotion of the vehicle.

As a result, annoyance that is experienced by the occupant due to frequent changes in the emotion of the vehicle can be reduced or eliminated.

As described above, according to the information providing device having the above-described configuration, information in which the occupant may be interested can be provided while annoyance that is experienced by the occupant as information is provided to the occupant is reduced or eliminated.

In the information providing device, it is preferable that the base-emotion setting unit be further configured to set the base emotion in accordance with a difference between a previously estimated emotion of the occupant and a currently estimated emotion of the occupant.

According to the information providing device having the above-described configuration, the base emotion is set in accordance with the difference between a previously estimated emotion of the occupant and a currently estimated emotion of the occupant. As a result, when there is a change in the emotion of the occupant between the previous estimation and the current estimation, the base emotion and accordingly the emotion of the vehicle are generated by taking the change in the emotion into consideration. Information to be provided is determined in accordance with the emotion of the vehicle, so that the occupant can feel that the vehicle sympathizes with the occupant.

It is preferable that the information providing device according to the present disclosure further include a schedule-information obtaining unit that obtains schedule information of the occupant, and it is preferable that the base-emotion setting unit be further configured to set the base emotion by taking the schedule information of the occupant into consideration.

The schedule information of the occupant may be a cause of a change in the emotion of the occupant, and the base emotion of the vehicle is set by taking the schedule information into consideration. Accordingly, the emotion of the vehicle is generated. Information to be provided to the occupant is determined in accordance with the emotion of the target vehicle, so that the occupant may feel as if the vehicle sympathizes with the occupant.

BRIEF DESCRIPTION OF THE DRAWINGS

The advantages of the disclosure will become apparent in the following description taken in conjunction with the following drawings.

FIG. 4 is a diagram illustrating a configuration of an emotional expression of an agent.

FIGS. 5A to 5E are tables illustrating examples of information items that are stored in an information storage unit. FIG. 5A is a table illustrating an example of an emotion history of a target user. FIG. 5B is a table illustrating schedule information of a target user. FIG. 5C is a table illustrating the relationships between events and auxiliary offsets. FIG. 5D is a table illustrating the relationships between states of a vehicle and auxiliary offsets. FIG. 5E is a table illustrating the relationships between hypothetical emotions of a vehicle and contents.

FIG. 8 is a diagram illustrating a map of optional parts.

DETAILED DESCRIPTION (Configuration of Basic System)

Figure 1:
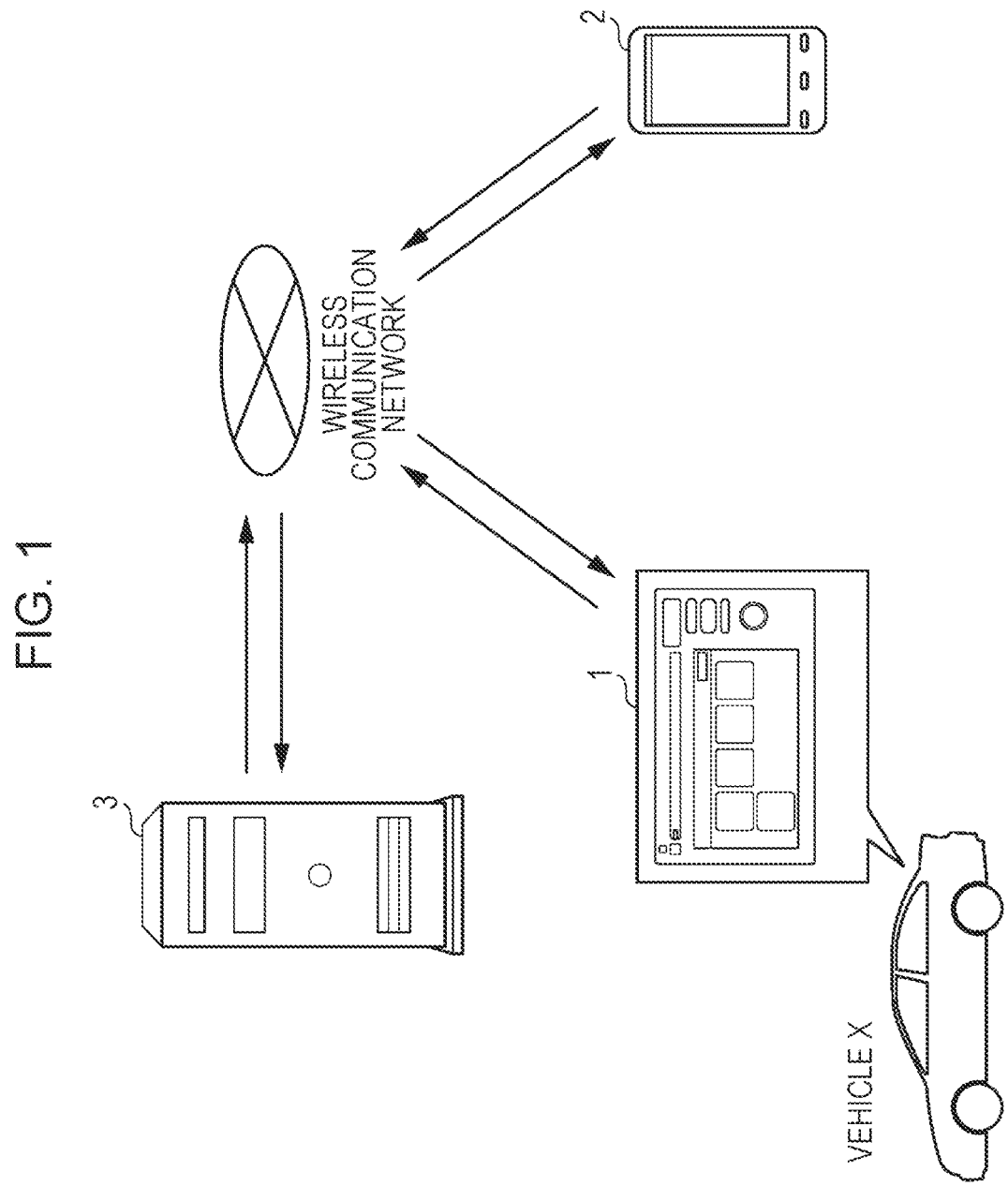
FIG. 1 is a diagram illustrating a configuration of a basic system of one embodiment.

A basic system illustrated in FIG. 1 includes an agent device 1 that is mounted on a target vehicle X (a movable object), a mobile terminal device 2 (e.g., a smartphone) that can be brought into the target vehicle X by an occupant, and a server 3. The agent device 1, the mobile terminal device 2, and the server 3 have a function of wirelessly communicating with one another over a wireless communication network (e.g., the Internet). The agent device 1 and the mobile terminal device 2 have a function of wirelessly communicating with each other by a short-range wireless communication system (e.g., the Bluetooth (Registered Trademark)) or a near field communication system when the agent device 1 and the mobile terminal device 2 are physically close to each other, that is, for example, when the agent device 1 and the mobile terminal device 2 are present in the same space in the target vehicle X. The target vehicle X corresponds to a vehicle according to the present disclosure.

(Configuration of Agent Device)

Figure 2:
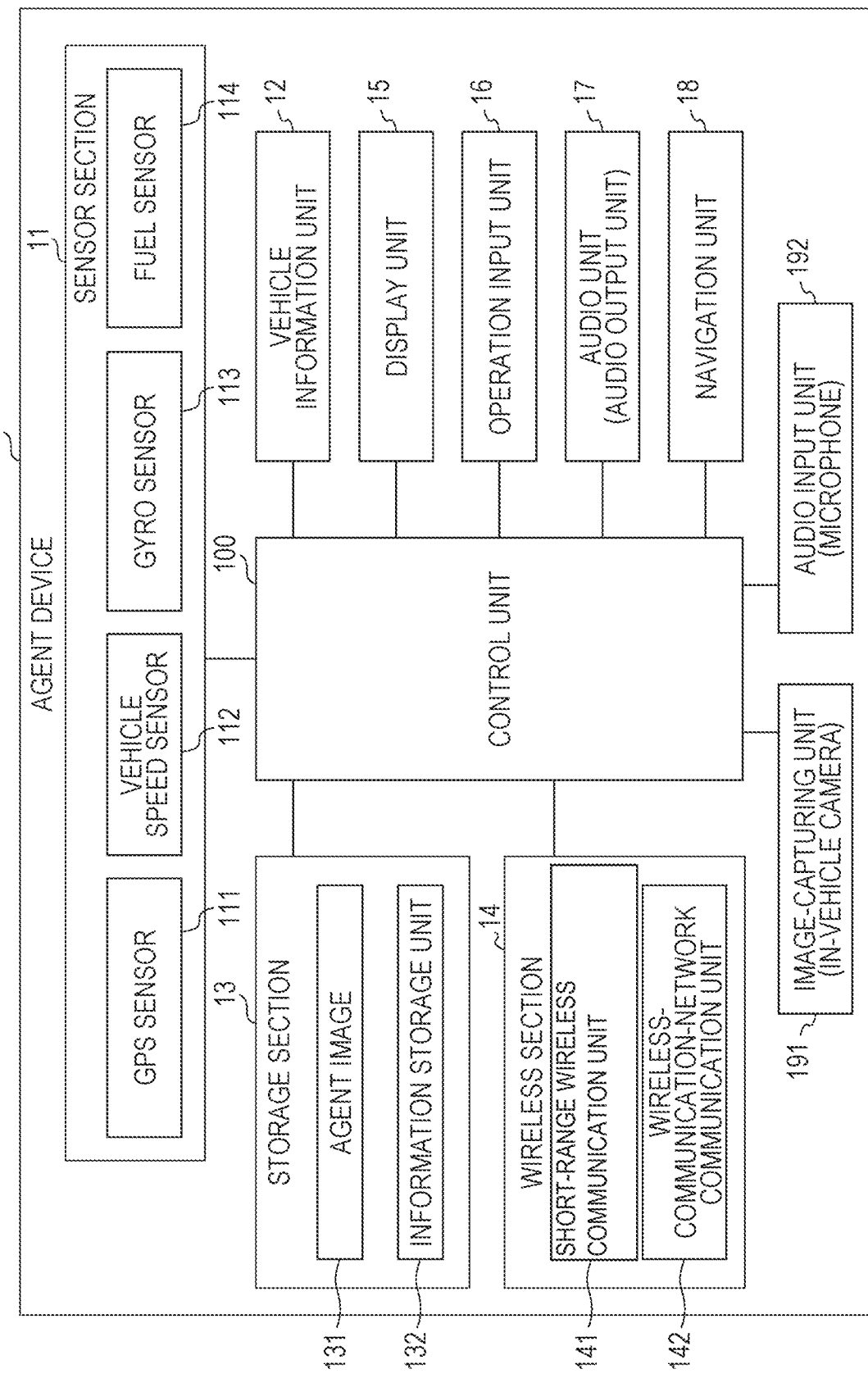
FIG. 2 is a diagram illustrating a configuration of an agent device of one embodiment.

As illustrated in FIG. 2, for example, the agent device 1 includes a control unit 100, a sensor section 11 (including a GPS sensor 111, a vehicle speed sensor 112, a gyro sensor 113, and a fuel sensor 114), a vehicle information unit 12, a storage section 13, a wireless section 14 (including a short-range wireless communication unit 141 and a wireless-communication-network communication unit 142), a display unit 15, an operation input unit 16, an audio unit (an audio output unit) 17, a navigation unit 18, an image-capturing unit (an in-vehicle camera) 191, and an audio input unit (a microphone) 192. The agent device 1 corresponds to an example of an information providing device according to the present disclosure. The display unit 15 and the audio unit 17 each correspond to an example of an information output unit according to the present disclosure. The operation input unit 16 and the audio input unit 192 each correspond to an example of an input unit according to the present disclosure. The sensor section 11 corresponds to a vehicle-state detection unit according to the present disclosure. The control unit 100 includes a hardware processor such as CPU, MPU and GPU and functions as a user detection unit 101, a date-and-time information detection unit 102, a user-state determination unit 103, an emotion estimation unit 104, a base-emotion setting unit 105, an emotion generation unit 106, and a schedule-information obtaining unit 107 by performing calculations, which will be described later. Note that it is not necessary for all the components of the information providing device to be included in the agent device 1, and the agent device 1 may communicate with an external server and the like so as to cause the external server and the like to perform necessary functions so as to function as the components of the information providing device.

The GPS sensor 111 of the sensor section 11 calculates the current position on the basis of a signal from a global positioning system (GPS) satellite. The vehicle speed sensor 112 calculates the speed of the target vehicle X on the basis of a pulsed signal from a rotary shaft. The gyro sensor 113 detects angular velocity. The fuel sensor 114 calculates the remaining amount of fuel of the target vehicle X on the basis of a signal from a fuel tank of the target vehicle X. The current position and the orientation of the target vehicle X can be accurately calculated by the GPS sensor 111, the vehicle speed sensor 112, and the gyro sensor 113. In addition, the GPS sensor 111 may obtain information that indicates the current date and time from the GPS satellite.

The vehicle information unit 12 (the vehicle-state detection unit) obtains vehicle information through an in-vehicle network such as CAN-BUS. The vehicle information includes, for example, information items regarding the ON/OFF states of an ignition SW and the operation status of a safety device system (such as ADAS, ABS, or an airbag). The operation input unit 16 detects inputs including an operation of pressing a switch, amounts of force applied to steering, an accelerator pedal, and a brake pedal by an occupant that can be used for estimating the emotion of the occupant, and operations of a window and an air conditioner (for temperature setting or the like).

The storage section 13 includes an agent image 131 and an information storage unit 132.

The agent image 131 is an image imitating a face of a person as an image of the face of a virtual character of the vehicle X. As illustrated in FIG. 4, the agent image 131 includes basic facial expression images 41 and optional parts 42. An applied facial expression image 43 is generated by combining one of the basic facial expression images 41 and one of the optional parts 42. The agent image 131 is, for example, an image downloaded from the server 3.

The information storage unit 132 stores various information items, and examples of the information items include an information item regarding an emotion history of a user that is illustrated in FIG. 5A, an information item regarding a schedule of a user that is illustrated in FIG. 5B, an information item regarding the relationship between an event and an auxiliary offset that is illustrated in FIG. 5C, an information item regarding the relationship between a state of a vehicle and an auxiliary offset that is illustrated in FIG. 5D, and an information item regarding the relationship between an emotion of a vehicle and a content that is illustrated in FIG. 5E. In addition to these information items, the information storage unit 132 stores various information items detected concomitantly with processing. The information item regarding an emotion history of a user, which illustrated in FIG. 5A, may be obtained in STEP 240 of the information output process (FIG. 6), which will be described later. For example, the information item regarding a schedule of a user, which is illustrated in FIG. 5B, may be detected through communication with a mobile terminal or the like carried by the user.

As illustrated in FIG. 4, the basic facial expression images 41 are images corresponding to emotions of, for example, liking, calmness, disliking, and withstanding. The optional parts 42 are parts that are related to expressions of lovely, fun, happy, relieved, sad, angry, suffering, and painful each of which corresponds to one of the basic facial expression images 41.

For example, a basic facial expression image 411 representing the emotion of liking and an optional part 421 representing the expression of lovely, which corresponds to the emotion of liking, are combined together, so that an applied expression image 431 representing the expression of lovely is generated.

The short-range wireless communication unit 141 of the wireless section 14 is a communicating unit that is compatible with, for example, the wireless fidelity (Wi-Fi) (registered Trademark) or the Bluetooth (Registered Trademark), and the wireless-communication-network communication unit 142 is a communicating unit that is connected to a wireless communication network, representative examples of which are so-called cellular phone networks such as 3G, cellular, and LTE communication networks. The short-range wireless communication unit 141 also uses a near-field communication.

(Configuration of Mobile Terminal Device)

Figure 3:
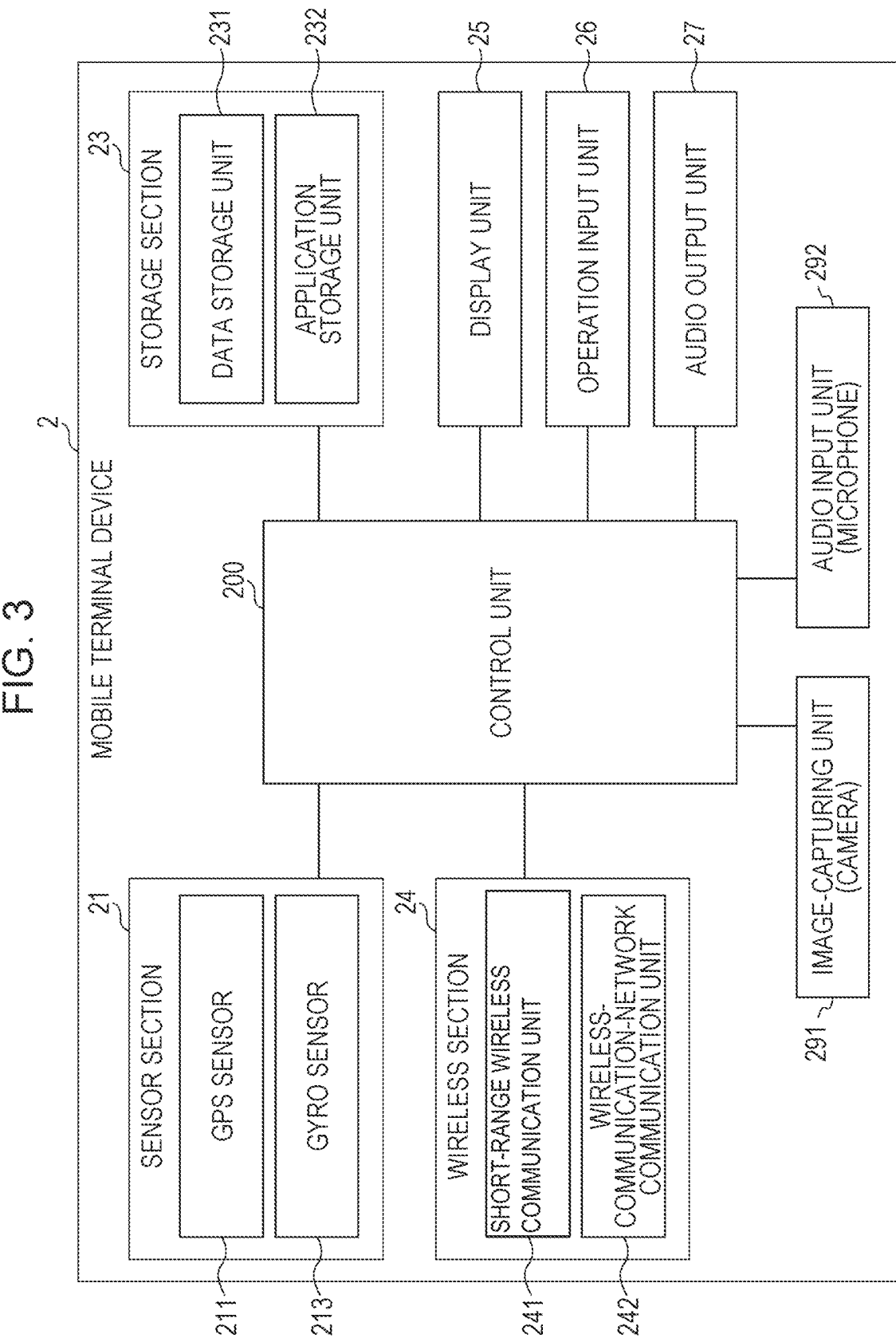
FIG. 3 is a diagram illustrating a configuration of a mobile terminal device of one embodiment.

As illustrated in FIG. 3, for example, the mobile terminal device 2 includes a control unit 200, a sensor section 21 (including a GPS sensor 211 and a gyro sensor 213), a storage section 23 (including a data storage unit 231, and an application storage unit 232), a wireless section 24 (including a short-range wireless communication unit 241 and a wireless-communication-network communication unit 242), a display unit 25, an operation input unit 26, an audio output unit 27, an image-capturing unit (a camera) 291, and an audio input unit (a microphone) 292. The mobile terminal device 2 may function as the information providing device according to the present disclosure. In this case, the display unit 25 and the audio output unit 27 each correspond to an example of the information output unit according to the present disclosure. The control unit 200 includes a hardware processor such as CPU, MPU and GPU and functions as a user detection unit 201, a date-and-time information detection unit 202, a user-state determination unit 203, an emotion estimation unit 204, a base-emotion setting unit 205, an emotion generation unit 206, and a schedule-information obtaining unit 207.

The mobile terminal device 2 includes a component common to the agent device 1. Although the mobile terminal device 2 does not include a component (see, for example, the fuel sensor 114 illustrated in FIG. 2) that obtains vehicle information, the mobile terminal device 2 can obtain vehicle information from the vehicle-state detection unit (the sensor section 11 and the vehicle information unit 12), which is included in the agent device 1 or which is mounted on the target vehicle X, through, for example, the short-range wireless communication unit 241. Alternatively, the mobile terminal device 2 may have functions similar to those of the audio unit 17 and the navigation unit 18 of the agent device 1 in accordance with an application (software) stored in the application storage unit 232. The short-range wireless communication unit 241 also uses a near-field communication.

(Configuration of Server)

The server 3 includes one or a plurality of computers. The server 3 is configured to receive data items and requests from the agent device 1 and the mobile terminal device 2, to store the data item into a storage unit such as a database, to perform processing in accordance with the request, and to transmit the processing result to the agent device 1 or the mobile terminal device 2.

Some or all of the computers included in the server 3 may be formed of mobile stations, which are, for example, one or more of the components included in the agent device 1 or in the mobile terminal device 2.

The wording "a component according to the present disclosure is configured to perform designated arithmetic processing" refers to the case where an arithmetic processing unit such as a CPU included in the component is "programmed" or "designed" to read necessary information and a software from memory, such as ROM or RAM, or a recording medium and perform arithmetic processing on the information in accordance with the software. The components may include a common processor (an arithmetic processing unit), or the components may include a plurality of processors that are capable of communicating with each other.

(Information Output Process)

The information output process will now be described with reference to FIG. 5A to FIG. 8.

Figure 6:
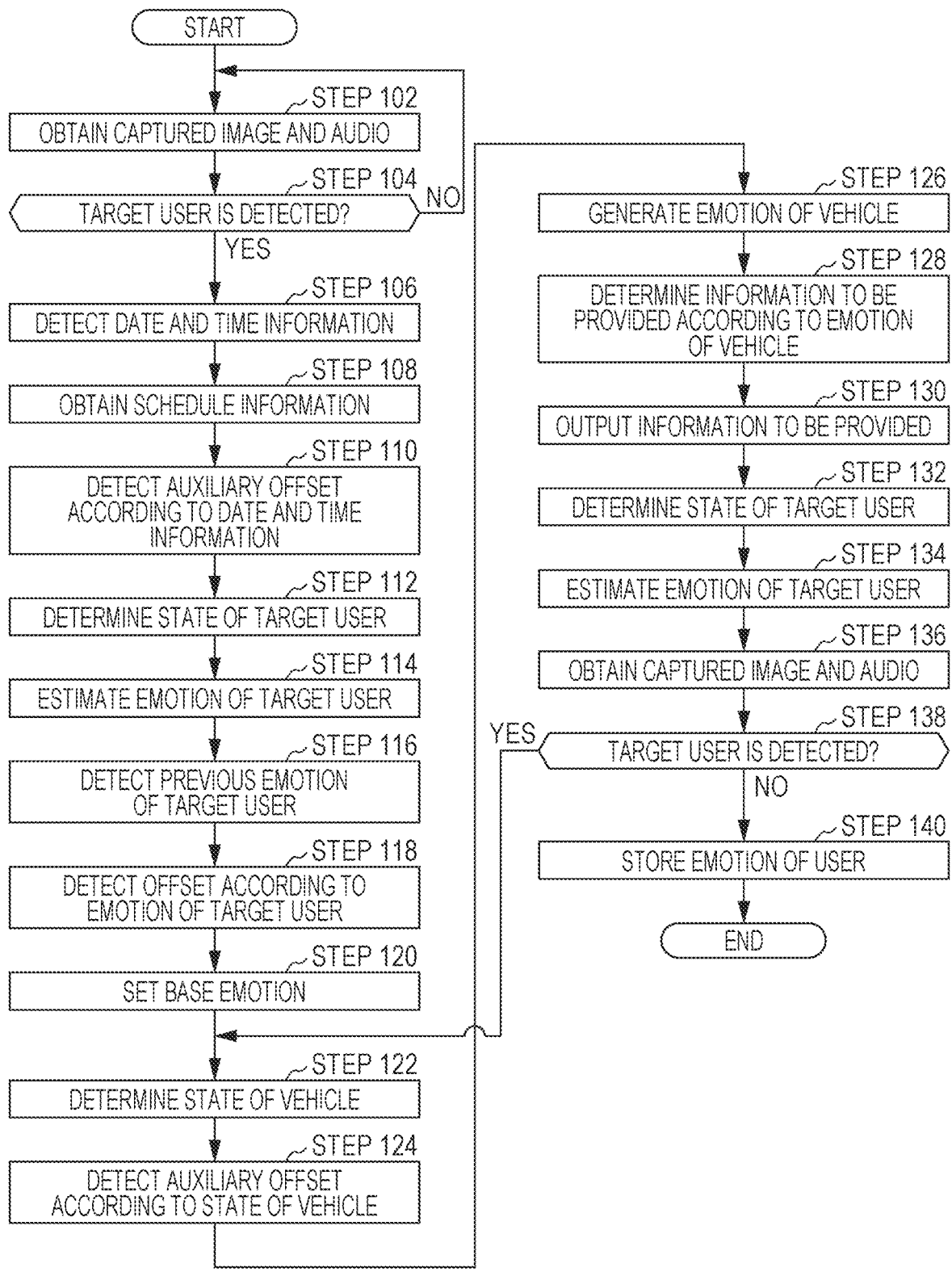
FIG. 6 is a flowchart of an information output process.

The control unit 100 (the user detection unit 101) of the agent device 1 detects either or both of captured image data and audio data through either or both of the image-capturing unit 191 and the audio input unit 192 and stores the detected data into the information storage unit 132 (STEP 102 of FIG. 6).

The control unit 100 (the user detection unit 101) of the agent device 1 performs image analysis or speech analysis on either or both of the captured image data and the audio data obtained in STEP 102 of FIG. 6 and determines whether an occupant (hereinafter suitably referred to as a target user) has been detected (STEP 104 of FIG. 6). Here, a commonly known technology can be applied to the image analysis or the speech analysis.

When the determination result is negative (NO in STEP 104 of FIG. 6), the control unit 100 of the agent device 1 performs the processing of STEP 102 of FIG. 6.

When the determination result is positive (YES in STEP 104 of FIG. 6), the control unit 100 (the date-and-time information detection unit 102) of the agent device 1 detects the date and time information at the time of performing the processing obtained by the GPS sensor 111 and stores the date and time information into the information storage unit 132 (STEP 106 of FIG. 6). The date and time information includes information items regarding date, time, and day of the week.

The control unit 100 (the schedule-information obtaining unit 107) of the agent device 1 detects a schedule of the target user that corresponds to the date and time information obtained in STEP 106 of FIG. 6 and stores the schedule into the information storage unit 132 (STEP 108 of FIG. 6). For example, when the date and time information obtained in STEP 106 of FIG. 6 is within a time range of 10:00 to 19:00 on Feb. 2, 2018, the control unit 100 of the agent device 1 detects an event "XX meeting" planned by the target user.

Figure 7:
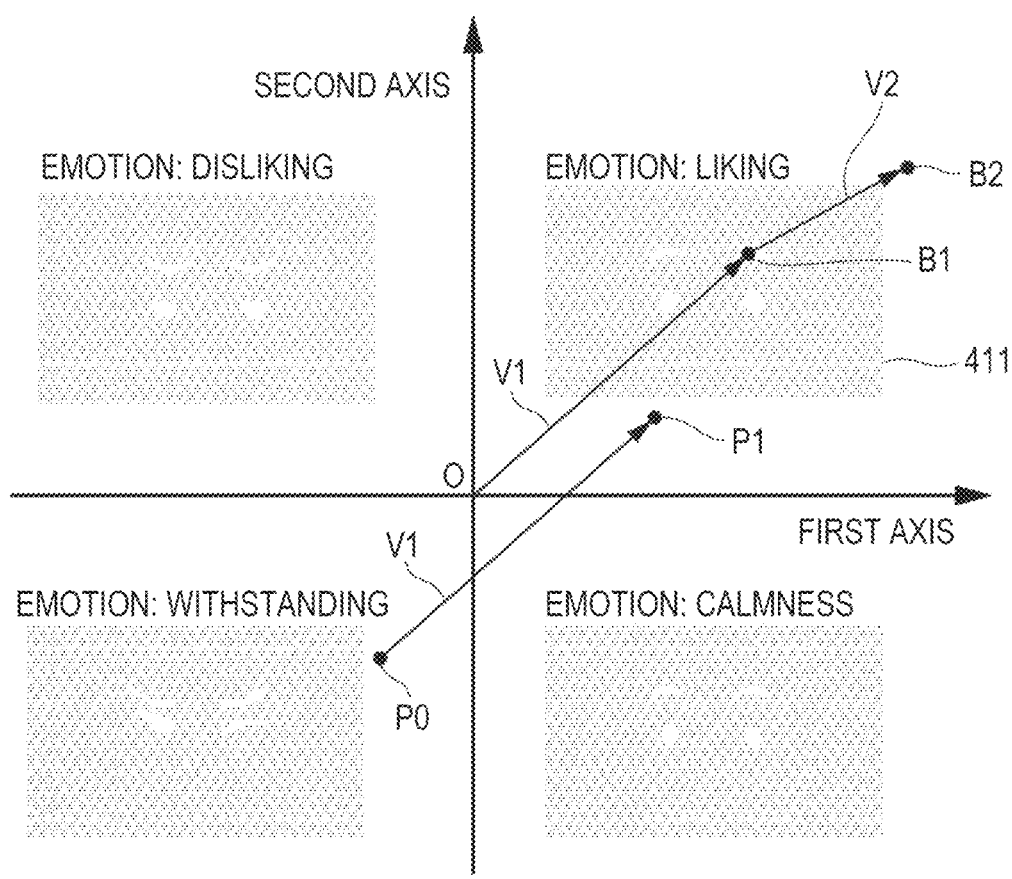
FIG. 7 is a diagram illustrating a map of basic emotional expression.

The control unit 100 (the base-emotion setting unit 105) of the agent device 1 detects an auxiliary offset that corresponds to the date and time information obtained in STEP 106 of FIG. 6 and stores the auxiliary offset into the information storage unit 132 (STEP 110 of FIG. 6). The auxiliary offset is a parameter set that is used in base-emotion setting in STEP 120 of FIG. 6, which will be described later, and it is preferable that the parameter set be a parameter set of the same dimension as a parameter set that indicates a base emotion. For example, the auxiliary offset is indicated by a first value and a second value that are illustrated in FIG. 7 and that respectively indicate steady state and calmness.

For example, the control unit 100 of the agent device 1 may detect an auxiliary offset (1, 2) corresponding to "Friday" that is an information item regarding day of the week included in the date and time information detected in STEP 106 of FIG. 6. For example, the control unit 100 of the agent device 1 may detect an auxiliary offset (2, 2) corresponding to the event "XX meeting" that has been detected in STEP 108 of FIG. 6. The control unit 100 of the agent device 1 may detect an auxiliary offset such that a base emotion, which will be described later, is likely to be a positive emotion (e.g., liking or calmness) as an event planned by the user approaches.

The control unit 100 (the user-state determination unit 103) of the agent device 1 determines the state of the target user (STEP 112 of FIG. 6). In addition, the control unit 100 stores either or both of time-series data items regarding the state of the target user into the information storage unit 132.

The control unit 100 of the agent device 1 determines the state of the target user on the basis of, for example, at least one of the following: an operation detected by the operation input unit 16, an image captured by the image-capturing unit 191, speech detected by the audio input unit 192, and biological information items of the target user who is a user of the target vehicle X, the biological information items obtained from a wearable sensor (not illustrated) worn by the target user.

For example, the control unit 100 determines the target user's answer to a question such as "How are you?", the answer indicating the state of the target user, on the basis of the operation detected by the operation input unit 16.

For example, the control unit 100 determines the facial expression and the behavior of the target user, which indicate the state of the target user, on the basis of the image captured by the image-capturing unit 191.

For example, the control unit 100 determines the contents of the speech made by the target user and the pitch of the target user's voice when the target user speaks, the contents of the speech and the pitch of the target user's voice indicating the state of the target user, on the basis of the speech detected by the audio input unit 192.

For example, the control unit 100 detects biological information items (such as myoelectricity, pulse, blood pressure, blood oxygen level, body temperature, and the like) received from the wearable sensor worn by the target user.

The control unit 100 (the emotion estimation unit 104) estimates the current emotion of the target user on the basis of the state of the target user determined in STEP 112 of FIG. 6 (STEP 114 of FIG. 6).

For example, the control unit 100 may estimate the emotion of the target user on the basis of the state of the target user in accordance with a predetermined rule.

The emotion of the target user is indicated by a plurality of parameter sets. The emotion of the target user is a parameter set that is used in the base-emotion setting in STEP 120 of FIG. 6, which will be described later, and it is preferable that the parameter set be a parameter set of the same dimension as a parameter set that indicates a base emotion.

For example, the emotion of the target user is indicated by a first value and a second value that are illustrated in FIG. 7 and that respectively indicate steady state and calmness.

For example, the control unit 100 may estimate the emotion of the target user on the basis of the target user's answer to a question. In the case where the target user's answer to the question is "same as usual", the control unit 100 may detect a relatively high value (e.g., 3) as the first value indicating the steady state of the target user. In the case where the target user's answer to the question is "different than usual", the control unit 100 may detect a relatively low value (e.g., −3) as the first value indicating the steady state of the target user.

In the case where a state in which the speed of the target vehicle X is equal to or higher than a predetermined speed continues for a certain period of time or longer, the control unit 100 may detect a relatively high value (e.g., 3) as the second value indicating the calmness of the target user. In the case where a state in which the speed of the target vehicle X is lower than a predetermined speed continues for a certain period of time or longer or in the case where the speed of the target vehicle X frequently fluctuates in a short period of time, the control unit 100 may detect a relatively low value (e.g., −3) as the second value indicating the calmness of the target user.

The control unit 100 may detect the second value such that the second value becomes higher or lower as the length of time over which one of the above-mentioned states continues increases.

In addition, the control unit 100 may estimate the emotion of the target user on the basis of the facial expression of the target user. For example, when the control unit 100 determines that the facial expression of the target user is similar to a smile by performing image analysis, the control unit 100 may detect a relatively high value (e.g., 5) as the second value indicating the calmness. For example, when the control unit 100 determines that the target user has a displeased face by performing image analysis, the control unit 100 may detect a relatively low value (e.g., −5) as the second value indicating the calmness. In addition to this or instead of this, the control unit 100 may estimate the emotion of the target user by taking into consideration the line of sight of the target user or the orientation of the face of the target user.

The control unit 100 may estimate the emotion of the target user on the basis of the behavior of the target user. For example, when the control unit 100 determines, by performing image analysis, that there is almost no movement of the target user, the control unit 100 may detect a relatively high value (e.g., 3) as the first value indicating the steady state of the target user. For example, when the control unit 100 determines, by performing image analysis, that the target user is restlessly moving, the control unit 100 may detect a relatively low value (e.g., −3) as the first value indicating the steady state of the target user.

The control unit 100 may estimate the emotion of the target user on the basis of the contents of the speech made by the target user. For example, when the control unit 100 determines, by performing speech analysis, that the speech made by the target user has a positive content such as a compliment to something or expectations of something, the control unit 100 may detect a relatively high value (e.g., 5) as the second value indicating the calmness. For example, when the control unit 100 determines, by performing speech analysis, that the speech made by the target user has a negative content such as a criticism of something, the control unit 100 may detect a relatively low value (e.g., −5) as the second value indicating the calmness. In addition, when the contents of the speech made by the target user include a particular keyword (e.g., "nice" or "very nice"), the control unit 100 may estimate the emotion of the target user on the basis of the type of emotion and the intensity of emotion that are associated with the keyword.

The control unit 100 may estimate the emotion of the target user on the basis of the pitch of the target user's voice when the target user speaks. For example, when the pitch of the target user's voice when the target user speaks is equal to or higher than a predetermined pitch, the control unit 100 may detect a relatively low value (e.g., −3) as the first value indicating the steady state of the target user. When the pitch of the target user's voice when the target user speaks is lower than a predetermined pitch, the control unit 100 may detect a relatively high value (e.g., 3) as the first value indicating the steady state of the target user.

The control unit 100 may detect the first value indicating the steady state of the target user and the second value indicating the calmness of the target user by using biological information items (such as myoelectricity, pulse, blood pressure, blood oxygen level, body temperature, and the like) received from the wearable sensor worn by the target user.

Alternatively, for example, the control unit 100 may detect the first value indicating the steady state of the target user and the second value indicating the calmness of the target user on the basis of the travelling state of the target vehicle X and the state of the target user by using an emotion engine that outputs the emotion of the target user by referencing to the travelling state of the target vehicle X and the state of the target user generated by machine learning.

Alternatively, for example, the control unit 100 may detect the first value indicating the steady state of the target user and the second value indicating the calmness of the target user on the basis of the travelling state of the target vehicle X and the state of the target user by referencing to a predetermined table.

The control unit 100 may detect the first value indicating the steady state of the target user and the second value indicating the calmness of the target user by combining the above-described methods.

A case will be described below in which the control unit 100 detects the first value "2" indicating the steady state of the target user and the second value "1" indicating the calmness of the target user as a parameter set P1 indicating the current emotion of the target user in STEP 114 of FIG. 6.

The control unit 100 (the emotion estimation unit 104) detects the previously estimated emotion of the target user by referencing to the information item regarding an emotion history of the target user that is stored in the information storage unit 132 (STEP 116 of FIG. 6). For example, the control unit 100 detects the first value "−1" indicating the steady state of the target user and the second value "−2" indicating the calmness of the target user at 7:00 on Feb. 2, 2018 that are illustrated in FIG. 5A as a parameter set P0 indicating the current emotion of the target user.

The control unit 100 (the base-emotion setting unit 105) detects an offset corresponding to the emotion of the target user that has been detected in STEP 114 of FIG. 6 (STEP 118 of FIG. 6). For example, as illustrated in FIG. 7, the control unit 100 may detect, as the offset, a vector V1 from a parameter set P2 indicating the previous emotion of the target user, which has been detected in STEP 116 of FIG. 6, to the parameter set P1 indicating the current emotion of the target user, which has been detected in STEP 114 of FIG. 6. The control unit 100 may detect, as the offset, a vector obtained by multiplying the vector V1 by a predetermined coefficient.

The control unit 100 (the base-emotion setting unit 105) sets a base emotion, which is the base of a hypothetical emotion of the target vehicle X, on the basis of the offset detected in STEP 118 of FIG. 6 (STEP 120 of FIG. 6). For example, the control unit 100 may set, as a parameter set indicating the base emotion, a parameter set B1 indicated by the vector V1 that is the offset detected in STEP 118 of FIG. 6 while the origin functions as a reference. Alternatively, the control unit 100 may detect, as the parameter set indicating the base emotion, a parameter set B2 that is determined by taking into consideration the auxiliary offset detected in STEP 110 of FIG. 6 while the parameter B1 functions as a reference.

The control unit 100 determines the state of the target vehicle X on the basis of the information obtained by the sensor section 11 (STEP 122 of FIG. 6). In addition, the control unit 100 stores time-series data regarding the determined state of the target vehicle X into the information storage unit 132.

For example, the control unit 100 (the emotion generation unit 106) determines, on the basis of the information obtained by the sensor section 11, the time-series positions of the target vehicle X, the travelling speed of the target vehicle X, and the orientation of the target vehicle X, each of which indicates the operating state of the target vehicle X. The control unit 100 determines the remaining amount of fuel of the target vehicle X on the basis of the information obtained by the sensor section 11.

The control unit 100 (the emotion generation unit 106) detects an auxiliary offset that corresponds to the state of the target vehicle X, which has been determined in STEP 122 of FIG. 6, by referencing to the information stored in the information storage unit 132. The control unit 100 detects an auxiliary offset that corresponds to the state of the target vehicle X on the basis of the relationship between the state of the target vehicle X and the auxiliary offset, the relationship being stored in the information storage unit 132 and illustrated in FIG. 5D. For example, when the remaining amount of fuel is equal to or lower than a predetermined amount, the control unit 100 detects an auxiliary offset by which the emotion of the target vehicle X is likely to become a negative emotion (e.g., disliking or withstanding). For example, when the travelling speed of the target vehicle X has been equal to or higher than a predetermined speed continues for a certain period of time or longer, the control unit 100 detects an auxiliary offset by which the emotion of the target vehicle X is likely to become a positive emotion (e.g., liking or calmness).

The control unit 100 (the emotion generation unit 106) determines a hypothetical emotion of the target vehicle X on the basis of the base emotion that has been set in STEP 120 of FIG. 6 and the auxiliary offset that has been detected in STEP 124 of FIG. 6 (STEP 126 of FIG. 6). The control unit 100 determines the hypothetical emotion of the target vehicle X by moving a parameter set by a distance corresponding to the auxiliary offset, which has been detected in STEP 124 of FIG. 6, from a reference position that is indicated by the parameter set of the base emotion, which has been set in STEP 120 of FIG. 6. Then, the control unit 100 determines the hypothetical emotion of the target vehicle X on the basis of the emotion map illustrated in FIG. 7 or the emotion map illustrated in FIG. 8 by using the emotion of the target vehicle X and determines an expression that corresponds to the emotion.

Note that the emotion maps illustrated in FIG. 7 and FIG. 8 each have a first axis denoting steady state and a second axis denoting calmness.

For example, when an agent-emotion index value lies in the first quadrant of FIG. 7, the control unit 100 determines that the hypothetical emotion of the target vehicle X is "liking" and selects the basic facial expression image 411 representing the emotion of liking as a basic expression of the emotional expression of an agent. Instead of or in addition to an image, the control unit 100 may select, as a basic expression of the emotional expression of the agent, a voice message or music having a content or a manner of speaking that corresponds to the emotion of the agent.

For example, when the agent-emotion index value has a value on the first axis that is equal to or greater than a first threshold T1 and a value on the second axis that is equal to or greater than a second threshold T2, the control unit 100 determines that the hypothetical emotion of the target vehicle X is "lovely" by using a map such as that illustrated in FIG. 8 and selects the optional part 421 representing the expression of "lovely" as an applied expression of the emotional expression of the agent. For example, when the agent-emotion index value has a value on the first axis that is equal to or greater than the first threshold T1 and a value on the second axis that is zero or more and less than the second threshold value T2, the control unit 100 determines that the hypothetical emotion of the target vehicle X is "fun" and selects an optional part 422 representing the expression of "fun" as an applied expression of the emotional expression of the agent. For example, when the agent-emotion index value has a value on the first axis that is zero or more and less than the first threshold T1, the control unit 100 does not select any of the optional parts as an applied expression of the emotional expression of the agent. The control unit 100 may select one of the optional parts on the basis of an evaluation axis that is different from both the first axis and the second axis.

In addition, the control unit 100 may determine the hypothetical emotion of the target vehicle X such that the hypothetical emotion of the target vehicle X is similar to the emotion of the target user by estimating the emotion of the target user in a manner similar to STEP 114 of FIG. 6.

The control unit 100 (an information determination unit 108) selects contents to be output and an output manner in accordance with the hypothetical emotion of the target vehicle X (STEP 128 of FIG. 6). The contents to be output may be various contents including questions related to a user's preference, other questions, news, bits of knowledge, introductions of the area where the user is travelling, introductions of famous locations, contents such as music, and explanations of the music. It is preferable that the emotion of the target vehicle X be reflected in the output manner reflect, and for example, when the emotion of the target vehicle X is "liking" (in the first quadrant of FIG. 7), it is preferable that the pitch of the voice to be output be high.

For example, the control unit 100 may determine contents to be output on the basis of the relationship between the target vehicle X and contents, the relationship being stored in the information storage unit 132 and illustrated in FIG. 5E. For example, the control unit 100 may transmit a parameter set indicating the hypothetical emotion of the target vehicle X to the server 3 and may receive the contents to be output and the output manner.

The control unit 100 causes either or both of the display unit 15 and the audio unit 17 to output information in accordance with the contents of the selected information to be output and the selected output manner (STEP 130 of FIG. 6).

The control unit 100 (the user-state determination unit 103) determines the state of the target user in a manner similar to STEP 112 of FIG. 6 (STEP 132 of FIG. 6).

The control unit 100 (the emotion estimation unit 104) estimates the emotion of the target user in a manner similar to STEP 114 of FIG. 6 (STEP 134 of FIG. 6).

The control unit 100 (the user detection unit 101) obtains captured image data and audio data in a manner similar to STEP 102 of FIG. 6 (STEP 136 of FIG. 6).

The control unit 100 (the user detection unit 101) determines, in a manner similar to STEP 104 of FIG. 6, whether an occupant has been detected on the basis of the data obtained in STEP 136 of FIG. 6 (STEP 138 of FIG. 6).

When the determination result is positive (YES in STEP 138 of FIG. 6), the control unit 100 performs the processing of STEP 122 and the processing of the subsequent STEPs of FIG. 6.

When the determination result is negative (NO in STEP 138 of FIG. 6), the control unit 100 (the emotion estimation unit 104) stores the parameter set indicating the emotion of the user estimated in STEP 134 of FIG. 6 into the information storage unit 132 and terminates the information output process.

(Advantageous Effects of Present Embodiment)

In the agent device 1 having the above-described configuration (corresponding to the information providing device according to the present disclosure), the control unit 100 (that functions as an emotion estimation unit according to the present disclosure) estimates the emotion of a target user after the target user got in the target vehicle X (STEP 114 of FIG. 6).

Then, the control unit 100 (that functions as a base-emotion setting unit according to the present disclosure) sets a base emotion, which is the base of a hypothetical emotion of the target vehicle X, on the basis of the emotion of the target user estimated by the emotion estimation unit 104 (the control unit 100) (STEP 120 of FIG. 6).

Subsequently, the control unit 100 (the emotion generation unit 106) generates an emotion of the target vehicle X in accordance with the base emotion and the state of the target vehicle X detected by the sensor section 11 (corresponding to the vehicle-state detection unit according to the present disclosure) (STEP 126 of FIG. 6).

After that, the control unit 100 (that functions as an information determination unit according to the present disclosure) determines information to be provided to the target user on the basis of the emotion of the target vehicle X (STEP 128 of FIG. 6).

Since a base emotion is an emotion that is set on the basis of the emotion of a target user estimated after the target user got in the target vehicle X, the emotion of the target vehicle X that is generated in accordance with the base emotion is an emotion according to the emotion of the target user during the period when the target user is in the target vehicle X.

The emotion of the target user during the period when the target user is in the target vehicle X often indicates the status of the target user, which is, for example, the target user being excited before a holiday. A hypothetical emotion of the target vehicle X is generated by taking into consideration the emotion of the target user during the period when the target user is in the target vehicle X that may indicate such a status of the target user, and information to be provided to the target user is determined in accordance with the hypothetical emotion of the target vehicle X. As a result, the target user can feel that the target vehicle X sympathizes with the situation of the target user, and this may cause the target user to be interested in the provided information.

The control unit 100 (that functions as an emotion generation unit according to the present disclosure) generates the emotion of the target vehicle X by taking an emotion into consideration in accordance not with "the emotion of an occupant" that is estimated during the period when the target vehicle X is travelling but with "the state of the target vehicle X" (STEP 122 of FIG. 6, STEP 126 of FIG. 6).

The emotion of a target user that is estimated during the period when the target vehicle X is travelling is influenced by many factors such as relationships with other vehicles, changes of traffic lights, and road conditions, and thus, there is a possibility that the emotion of the target user will wildly change depending on the personality of the target user. In contrast, changes in the state of the target vehicle X are small, and thus, as a result of the hypothetical emotion of the target vehicle X being generated by taking the state of the target vehicle X into consideration, frequent changes in the hypothetical emotion of the target vehicle X can be suppressed while the state of the target vehicle X is reflected in the emotion of the target vehicle X.

As a result, annoyance that is experienced by the target user due to frequent changes in the hypothetical emotion of the target vehicle X can be reduced or eliminated.

As described above, according to the agent device 1 having the above-described configuration, information in which a target user may be interested can be provided while annoyance that is experienced by the target user as information is provided to the target user is reduced or eliminated.

In addition, according to the agent device 1 having the above-described configuration, a base emotion is set in accordance with the difference between the previously estimated emotion of a target user and the currently estimated emotion of the target user (STEP 114 of FIG. 6 to STEP 120 of FIG. 6). As a result, when there is a change in the emotion of the target user between the previous estimation and the current estimation, the base emotion and accordingly the hypothetical emotion of the target vehicle X are generated by taking the change in the emotion into consideration. Information to be provided is determined in accordance with the hypothetical emotion of the target vehicle X, so that the target user can feel that the target vehicle X sympathizes with the change in the emotion of the target user and that the information to be output is selected.

Schedule information of a target user may be a cause of a change in the emotion of the target user, and the base emotion of the target vehicle X is set by taking the schedule information into consideration (STEP 106 to STEP 110 and STEP 120 of FIG. 6). Accordingly, the emotion of the target vehicle X is generated (STEP 126 of FIG. 6). As described above, a hypothetical emotion of the target vehicle X is generated by taking schedule information of a target user into consideration, and information to be provided to the target user is determined in accordance with the emotion, so that the target user may feel as if the target vehicle X sympathizes with the situation of the target user.

Modifications

In the present embodiment, when processing operations are sequentially performed after a target user has been detected (YES in STEP 104 of FIG. 6), the control unit 100 estimates the emotion of the target user and sets a base emotion by taking the emotion of the target user into consideration (STEP 106 to STEP 120 of FIG. 6).

Instead of or in addition to this, after the target user has been detected (YES in STEP 104 of FIG. 6), the control unit 100 may repeatedly estimate the emotion of the target user until a predetermined period of time passes and may set a base emotion by taking the estimated emotions into consideration after the predetermined period of time has passed.

Here, the "predetermined period of time" may be a sufficient time (e.g., 10 minutes), which is experimentally calculated, to estimate with high accuracy the emotion of the target user immediately after the target user has gotten in the target vehicle X or may be, for example, the time taken for the state of the target vehicle X to become a predetermined state (a state in which the speed of the target vehicle X is equal to or higher than a predetermined speed or a state in which the steering amount for the target vehicle X is equal to or higher than a predetermined steering amount).

In addition, although the present embodiment has been described on the precondition that there is a single occupant (a single target user), the control unit 100 may perform similar processing operations for a plurality of occupants.

An example of a processing operation for a plurality of occupants will be described below.

The user-state determination unit 103 determines the state of each of the plurality of occupants.

The emotion estimation unit 104 estimates the emotion of each of the plurality of occupants in view of the state of each of the plurality of occupants.

The base-emotion setting unit 105 tentatively determines a hypothetical emotion that is common to the plurality of occupants from the emotion of each of the plurality of occupants. For example, the base-emotion setting unit 105 tentatively determines a parameter set indicating the hypothetical emotion common to the plurality of occupants by obtaining the average value of the parameter sets each indicating the emotion of one of the plurality of occupants.

The base-emotion setting unit 105 determines a hypothetical emotion of the target vehicle X on the basis of the hypothetical emotion common to the plurality of occupants, which has been tentatively determined. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. An information providing device comprising:
   an emotion estimation processor configured to estimate an emotion of an occupant within a predetermined period of time from a time when the occupant gets in a vehicle;
   a base-emotion setting processor configured to set a base emotion, which constitutes a base of an emotion of the vehicle, based on the emotion of the occupant estimated by the emotion estimation processor;
   a vehicle-state detector configured to detect a state of the vehicle;
   an emotion generation processor configured to obtain a state-of-vehicle offset parameter that corresponds to the state of the vehicle detected by the vehicle-state detector and generate the emotion of the vehicle by reflecting the state of the vehicle to the emotion of the occupant by modifying a parameter that corresponds to the base emotion with the state-of-vehicle offset parameter;
   an information determination processor configured to determine, based on the emotion of the vehicle, information to be provided to the occupant; and
   an information output device that outputs the information to the occupant,
   wherein the emotion generation processor uses an emotion map, and determines the emotion of the vehicle by moving a parameter set by a distance corresponding to the state-of-vehicle offset parameter from a reference position on the emotion map that is indicated by the parameter corresponding to the base emotion.

2. The information providing device according to claim 1, wherein the base-emotion setting processor is further configured to set the base emotion in accordance with a difference between a previously estimated emotion of the occupant and a currently estimated emotion of the occupant.

3. The information providing device according to claim 2, wherein the base-emotion setting processor is further configured to set the base emotion in accordance with a vector of change from the previously estimated emotion of the occupant to the currently estimated emotion of the occupant.

4. The information providing device according to claim 1, further comprising:
   a schedule-information obtaining processor configured to obtain schedule information of the occupant,
   wherein the base-emotion setting processor is further configured to set the base emotion by taking the schedule information of the occupant into consideration.

5. The information providing device according to claim 4,
   wherein the schedule information of the occupant includes a scheduled event,
   wherein the base-emotion setting processor is further configured to set the base emotion by taking the scheduled event of the occupant into consideration.

6. The information providing device according to claim 1, wherein the emotion generation processor is configured to determine the emotion of the vehicle by taking the state of the vehicle into consideration to suppress frequent changes in the determined emotion of the vehicle.

7. The information providing device according to claim 1, wherein the state of the vehicle is an operating state of the vehicle.

8. The information providing device according to claim 1, wherein the base-emotion setting processor sets the base emotion by adding at least one of an offset or an auxiliary offset to the emotion of the occupant estimated by the emotion estimation processor.

9. The information providing device according to claim 1,
   wherein the base-emotion setting processor sets the base emotion by adding at least one of an offset or an auxiliary offset to the emotion of the occupant estimated by the emotion estimation processor, and
   the auxiliary offset is defined by a first parameter and a second parameter, the first parameter indicating steady state of the emotion of the occupant and the second parameter indicating calmness of the emotion of the occupant.

10. The information providing device according to claim 1,
    wherein the base-emotion setting processor sets the base emotion by adding an offset and an auxiliary offset to the emotion of the occupant estimated by the emotion estimation processor, and
    the auxiliary offset is set such that the base emotion becomes a more positive emotion as an event scheduled by the occupant approaches by setting the auxiliary offset to a positive value.

11. An information providing method that is employed by a device comprising a computer, the method comprising steps of:
    estimating, by using the computer, an emotion of the occupant within a predetermined period of time from a time when the occupant gets in the vehicle;
    setting, by using the computer, a base emotion, which constitutes a base of an emotion of the vehicle, based on the estimated emotion of the occupant;
    obtaining, by using the computer, a state-of-vehicle offset parameter that corresponds to the state of the vehicle detected by the vehicle-state detection device;
    generating, by using the computer, the emotion of the vehicle by reflecting the state of the vehicle to the emotion of the occupant by modifying a parameter that corresponds to the base emotion with the state-of-vehicle offset parameter;
    determining, by using the computer, based on the emotion of the vehicle, information to be provided to the occupant; and
    outputting the determined information to the information output device,
    wherein the generating step uses an emotion map, and determines the emotion of the vehicle by moving a parameter set by a distance corresponding to the stateof-vehicle offset parameter from a reference position on the emotion map that is indicated by the parameter corresponding to the base emotion.

* * * * *